(12) United States Patent
Creek

(10) Patent No.: US 6,944,581 B2
(45) Date of Patent: Sep. 13, 2005

(54) COLLIMATED VISUAL DISPLAY APPARATUS

(75) Inventor: Roy Edward Creek, Newick (GB)

(73) Assignee: SEOS Limited, West Sussex (GB)

( * ) Notice: Subject to any disclaimer, the term of this patent is extended or adjusted under 35 U.S.C. 154(b) by 672 days.

(21) Appl. No.: 09/879,594

(22) Filed: Jun. 12, 2001

(65) Prior Publication Data

US 2001/0053966 A1 Dec. 20, 2001

(30) Foreign Application Priority Data

Jun. 15, 2000 (GB) .............................................. 0014672

(51) Int. Cl.⁷ ................................................ G06G 7/48
(52) U.S. Cl. ............................. 703/6; 434/38; 434/40; 434/44; 359/451; 359/460
(58) Field of Search ....................... 703/6, 7, 8; 434/38, 434/36, 44, 29, 40; 359/451, 453, 459, 460; 352/85, 86; 353/7, 10, 30

(56) References Cited

U.S. PATENT DOCUMENTS

| 3,820,873 A | * | 6/1974 | Redington et al. ............. 352/86 |
| 4,234,891 A | | 11/1980 | Beck et al. .................. 348/121 |
| 4,729,631 A | * | 3/1988 | Takahashi et al. .......... 359/451 |
| 5,175,575 A | * | 12/1992 | Gersuk ........................ 359/451 |
| 5,181,355 A | | 1/1993 | Skolnick et al. ............. 52/81.3 |
| 5,433,670 A | * | 7/1995 | Trumbull ..................... 352/85 |
| 5,502,481 A | * | 3/1996 | Dentinger et al. ............ 348/51 |
| 5,525,272 A | | 6/1996 | Dugdale .................... 264/1.34 |
| 5,566,370 A | * | 10/1996 | Young .......................... 434/44 |
| 5,746,599 A | * | 5/1998 | Lechner ....................... 434/44 |
| 5,926,153 A | * | 7/1999 | Ohishi et al. ................ 345/1.1 |
| 5,961,195 A | * | 10/1999 | Yoshimatsu et al. .......... 472/60 |
| 6,042,238 A | * | 3/2000 | Blackham et al. ............ 434/44 |
| 6,062,693 A | * | 5/2000 | Sato ........................... 359/471 |
| 6,176,584 B1 | * | 1/2001 | Best et al. .................... 353/30 |
| 6,188,517 B1 | * | 2/2001 | Neff et al. ................... 359/451 |
| 6,297,814 B1 | * | 10/2001 | Masuda et al. ............. 345/419 |
| 6,558,006 B2 | * | 5/2003 | Ioka ........................... 353/94 |

FOREIGN PATENT DOCUMENTS

| GB | 0265572 | 6/1927 | |
| JP | 10111534 | 4/1998 | |
| WO | WO 83/02028 | * 9/1983 | ............ G09B/9/08 |

* cited by examiner

Primary Examiner—W. Thomson
(74) Attorney, Agent, or Firm—Iandiorio & Teska

(57) ABSTRACT

Collimated visual display apparatus comprising an aspheric screen (12) and a curved collimating mirror (16), characterised in that the aspheric screen (12) is not a surface of revolution about an axis, the aspheric screen (12) comprises first and second parts (6, 8) which are separated from each other by a third part (10), the first and second parts (6, 8) are curved in cross section and if connected together then they would form a surface of revolution, the third part (10) is straight in cross sectional view and is a short cylindrical centre section, and the collimated visual display apparatus is such that the aspheric screen (12) has an outer curved surface that is viewed via the curved collimating mirror (16) by a user of the collimated visual display apparatus.

2 Claims, 2 Drawing Sheets

COLLIMATED VISUAL DISPLAY APPARATUS

FIELD OF THE INVENTION

This invention relates to collimated visual display apparatus and, more especially, this invention relates to collimated visual display apparatus comprising an aspheric screen and a curved collimating mirror. The collimated visual display apparatus may be for use in simulators used for training, research, leisure or entertainment.

In simulators used for training, research, leisure or entertainment it is well known to use large collimated displays. It is also well known that the large collimated displays may conveniently be formed from a large tilted concave mirror wrapped around a simulator cockpit. This arrangement collimates an image projected on to a large screen wrapped around the upper part of the cockpit above windows in the cockpit. The screen may be front-projected or back-projected.

For convenience and economy, the collimated image provided by the display should be visible from the full cockpit volume. In particular, an image of good quality and correct perspective should be visible to both pilots in a wide-bodied aircraft simulator.

In order to enhance the realism of the known simulators, the field of view of the display should be as large as possible. Horizontal fields of view of 180°–225° are common. A vertical field of view of 40° is most common, with 45°, 50°, 55° and 60° also being in use. It is known for typical wide-bodied cockpits that a 40° vertical field of view may satisfactorily be achieved with a spherical mirror of about 3 m radius and a spherical screen. A vertical field of view of 50° may be achieved with the same radius mirror, but the screen must become aspheric. For a 60° vertical field, not only must the screen become aspheric, but also the mirror radius must increase to about 3.3 m. Symmetry considerations arising from the large horizontal field of view and issues of manufacturing complexity mean that both the mirror and screen are surfaces of revolution about a vertical axis (not necessarily a common axis). A typical aspheric screen shape would be a torus.

As the visual display system becomes larger, it becomes more costly to manufacture, and its greater mass imposes an increasing load on the simulator. Also, since such simulators are usually mounted on some kind of motion system, the motion system expands, requiring a larger and more expensive building to house the simulator. Still further, the large collimating mirror should be as light in weight as possible, and preferably in one piece so as not to introduce gaps in the field of view. It is well known to form this large collimated mirror from a stretched aluminised plastics sheet. Sheet of adequate quality is only available up to a certain width, which therefore limits the size of the visual display system.

A 60° vertical field of view is found to be particularly useful for helicopter simulators, where it is typically disposed 20° up and 40° down. Such a visual display system can be realised within the constraints mentioned above. Such a large vertical field of view would be useful in other applications, perhaps disposed equally about the horizon, or with an upward bias. A 35° up, 25° down disposition would be of great interest for in-flight refueling simulation. However, a collimated image of adequate quality cannot be obtained within the above mentioned constraints for such a field of view disposition.

SUMMARY OF THE INVENTION

It is an aim of the present invention to obviate or reduce the above mentioned problems.

Accordingly, the present invention provides collimated visual display apparatus comprising an aspheric screen and a curved collimating mirror, characterised in that the aspheric screen is not a surface of revolution about an axis, the aspheric screen comprises first and second parts which are separated from each other by a third part, the first and second parts are curved in cross section and if connected together then they would form a surface of revolution, the third part is straight in cross sectional view and is a short cylindrical centre section, and the collimated visual display apparatus is such that the aspheric screen has an outer curved surface that is viewed via the curved collimating mirror by a user of the collimated visual display apparatus.

The use of the aspheric screen makes it possible to achieve a larger vertical field of view with no downward bias, without a substantial increase in the size or complexity of the collimated visual display apparatus.

Conceptually, in construction, the screen begins as a surface of revolution, which is split along its medium section. The two parts are separated and the short cylindrical centre section is inserted. The width of the cylindrical centre section is a further design parameter that can be used to achieve a more advantageous trade off between field of view and image quality.

The present invention also provides a simulator when including the collimated visual display apparatus. The simulator may be used for any suitable and appropriate purposes including training, research, leisure or entertainment.

An embodiment of the invention will now be described solely by way of example and with reference to the accompanying drawings in which.

Figure 1:
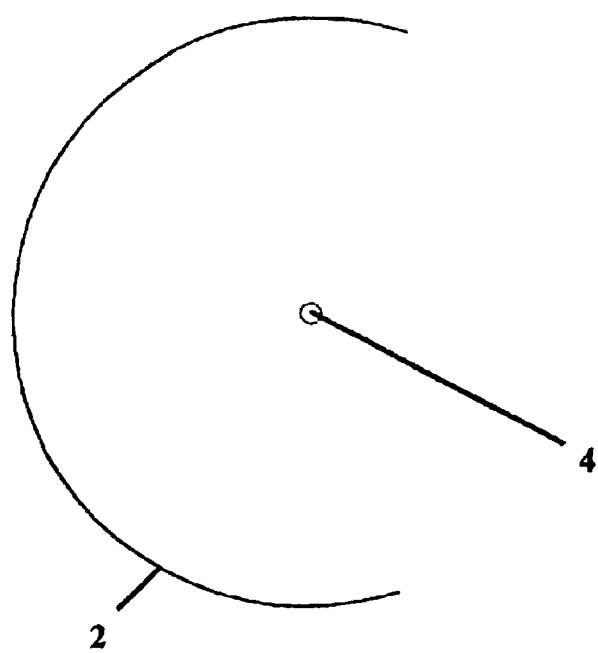
FIG. 1 shows a circular horizontal section through a known screen shape.

Referring to the drawings, FIG. 1 shows a circular horizontal section through a screen 2 of known shape. An axis of revolution 4 is also shown.

Figure 2:
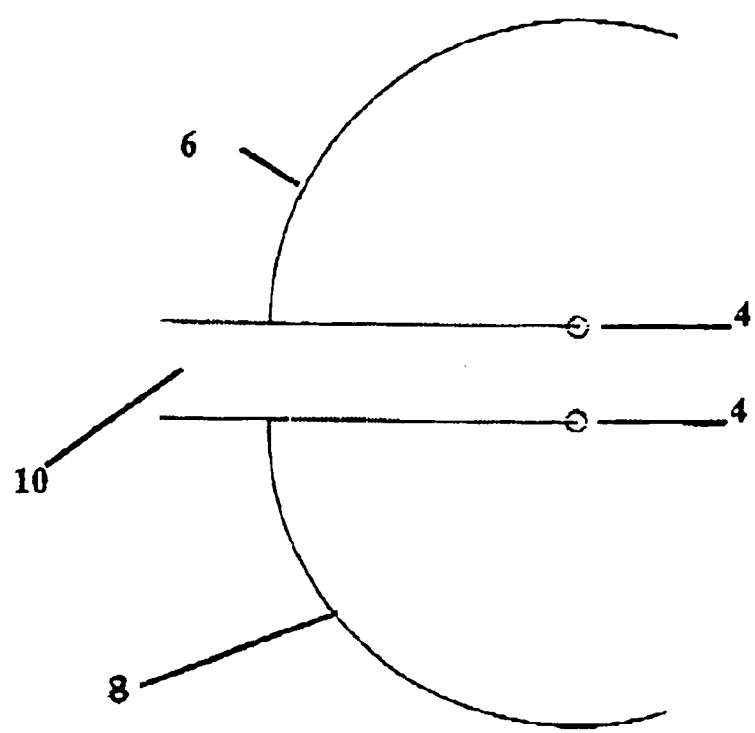
FIG. 2 shows the screen shape of FIG. 1, conceptually split and separated.

FIG. 2 shows the screen 2 of FIG. 1 conceptually split into first and second parts 6, 8 and separated by a third part 10.

Figure 3:
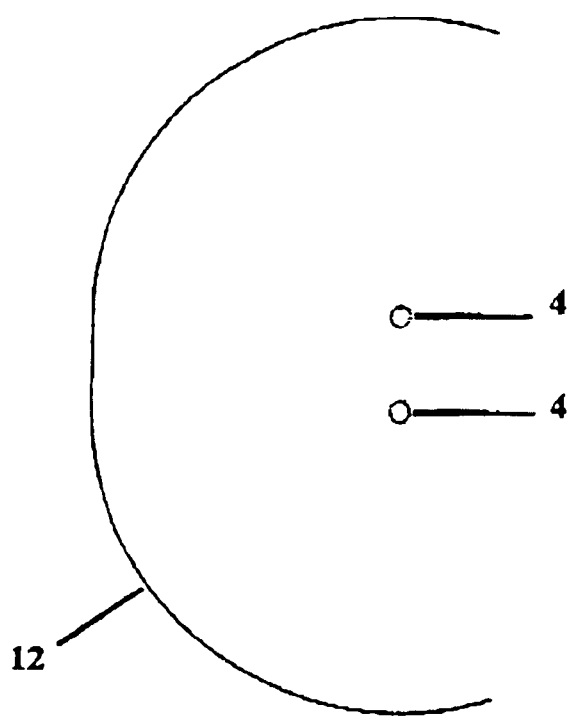
FIG. 3 shows an aspheric screen with its central cylindrical section inserted (still in horizontal section)

FIG. 3 shows an aspheric screen 12 which is formed to the shape shown in FIG. 2 so that the aspheric screen 12 comprises the first and second parts 6, 8 and the third part 10. As can be seen from FIGS. 2 and 3, the first and second parts 6, 8 are such that they are curved in cross section and if connected together, then they would form a surface of revolution. The third part 10 is such that it is straight in cross sectional view and is a short cylindrical centre section.

Figure 4:
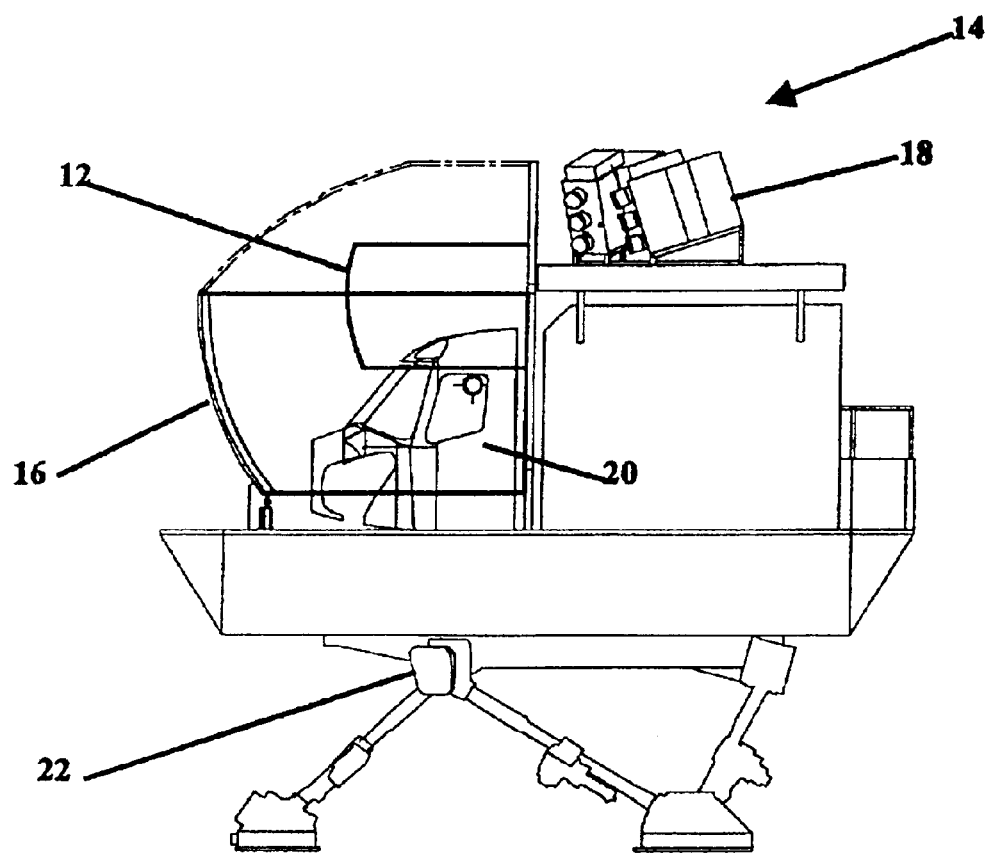
FIG. 4 shows a simulator using the aspheric screen shown in FIG. 3.

Referring now to FIG. 4, there is shown a simulator 14 containing collimated visual display apparatus including the aspheric screen 12, a curved collimating mirror 16 and projectors 18. Apart from the provision of the collimated visual display apparatus with the aspheric screen 12 and the curved collimating mirror 16, the simulator 14 may be of standard construction. Thus the simulator 14 has a cockpit 20 and a motion system 22. The motion system 22 may be any suitable and appropriate motion system 22.

The simulator 14 shown in FIG. 4 provides a large vertical field of view with no downward bias. This is achieved without substantial increase in the size or complexity of the collimated display system forming part of the visual display apparatus for the simulator 14.

It is to be appreciated that the embodiment of the invention described above with reference to the accompanying drawings has been given by way of example only and that modification may be effected. It is also to be appreciated from FIGS. 1–3 that the known screen shapes formed as surfaces of revolution appear as circular in the illustrated cross sectional views, and that the third part 10 is a central cylindrical segment which appears in the illustrated views as a straight line.

What is claimed is:

1. Collimated visual display apparatus comprising an aspheric screen and a curved collimating mirror, characterised in that the aspheric screen is not a surface of revolution about an axis, the aspheric screen comprises first and second parts which are separated from each other by a third part, the first and second parts are curved in cross section and if connected together then they would form a surface of revolution, the third part is straight in cross sectional view and is a short cylindrical center section, and the collimated visual display apparatus is such that the aspheric screen has an outer curved surface that is viewed via the curved collimating mirror by a user of the collimated visual display apparatus.

2. A simulator when including collimated visual display apparatus, the collimated visual display apparatus comprising an aspheric screen and a curved collimating mirror, characterised in that the aspheric screen is not a surface of revolution about an axis, the aspheric screen comprises first and second parts which are separated from each other by a third part, the first and second parts are curved in cross section and if connected together then they would form a surface of revolution, the third part is straight in cross sectional view and is a short cylindrical centre section, and the collimated visual display apparatus is such that the aspheric screen has an outer curved surface that is viewed via the curved collimating mirror by a user of the collimated visual display apparatus.

* * * * *

UNITED STATES PATENT AND TRADEMARK OFFICE
CERTIFICATE OF CORRECTION

PATENT NO. : 6,944,581 B2 Page 1 of 1
DATED : September 13, 2005
INVENTOR(S) : Roy Edward Creek It is certified that error appears in the above-identified patent and that said Letters Patent is hereby corrected as shown below:

<u>Title page, Item [54] and Column 1, lines 1-2,</u>
Title, should read -- ASPHERIC SCREEN FOR VISUAL DISPLAY APPARATUS --.

Signed and Sealed this

Fourth Day of April, 2006

JON W. DUDAS
*Director of the United States Patent and Trademark Office*